United States Patent
Chen et al.

(10) Patent No.: US 8,238,097 B2
(45) Date of Patent: Aug. 7, 2012

(54) COMPUTER SYSTEM

(75) Inventors: Li-Ping Chen, Taipei Hsien (TW);
Chen-Lu Fan, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 323 days.

(21) Appl. No.: 12/605,396

(22) Filed: Oct. 26, 2009

(65) Prior Publication Data

US 2011/0002099 A1    Jan. 6, 2011

(30) Foreign Application Priority Data

Jul. 2, 2009    (CN) .......................... 2009 1 0303954

(51) Int. Cl.
*H05K 5/00*    (2006.01)
*H05K 7/14*    (2006.01)

(52) U.S. Cl. ................... 361/679.58; 361/752; 361/796; 361/801

(58) Field of Classification Search ............. 361/679.58, 361/730, 752, 796, 800, 801–803, 807, 810
See application file for complete search history.

(56) References Cited

U.S. PATENT DOCUMENTS

| | | | |
|---|---|---|---|
| 5,544,006 A * | 8/1996 | Radloff et al. ........... | 361/679.32 |
| 5,757,618 A * | 5/1998 | Lee ........................... | 361/679.32 |
| 5,831,821 A * | 11/1998 | Scholder et al. ......... | 361/679.32 |
| 2002/0072255 A1 * | 6/2002 | Leman ...................... | 439/61 |
| 2003/0202334 A1 * | 10/2003 | Vier et al. .................. | 361/810 |
| 2005/0152122 A1 * | 7/2005 | Fan et al. ................... | 361/752 |
| 2006/0044767 A1 * | 3/2006 | Wu et al. .................... | 361/725 |
| 2007/0206368 A1 * | 9/2007 | Zhang et al. ............... | 361/801 |
| 2008/0055876 A1 * | 3/2008 | Fan et al. ................... | 361/801 |
| 2008/0100994 A1 * | 5/2008 | Fan et al. ................... | 361/679 |
| 2008/0130218 A1 * | 6/2008 | Fan et al. ................... | 361/685 |
| 2008/0259579 A1 * | 10/2008 | Chen et al. .................. | 361/756 |

* cited by examiner

*Primary Examiner* — Timothy Thompson
*Assistant Examiner* — Sherman Ng
(74) *Attorney, Agent, or Firm* — Altis Law Group, Inc.

(57) ABSTRACT

A computer system includes a chassis, a motherboard secured in the chassis, and a mounting bracket. A first socket and a second socket is disposed on the motherboard. The mounting bracket is secured to the chassis and located above the motherboard. A first riser card is coupled to the first socket, and a second riser card is coupled to the second socket. The computer system further includes a positioning member attached to the second riser card. The positioning member has two opposite side plates. One of the side plates is secured to the second riser card, and the other side plate is secured to the mounting bracket and aligned with the first riser card in a same plane.

20 Claims, 4 Drawing Sheets

COMPUTER SYSTEM

BACKGROUND

1. Technical Field

The present disclosure relates to computer systems, and particularly, to a computer system capable of mounting different types of expansion cards.

2. Description of Related Art

Expansion cards may not have compatible form factors with computer enclosures. As a result, a riser card may together with an extending chassis is adopted to secure the expansion card. However this method can only accommodate one type expansion card. Therefore, there is room for improvement.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 1 is an exploded, cutaway, isometric view of a computer system in accordance with one embodiment with.

DETAILED DESCRIPTION

Figure 1:
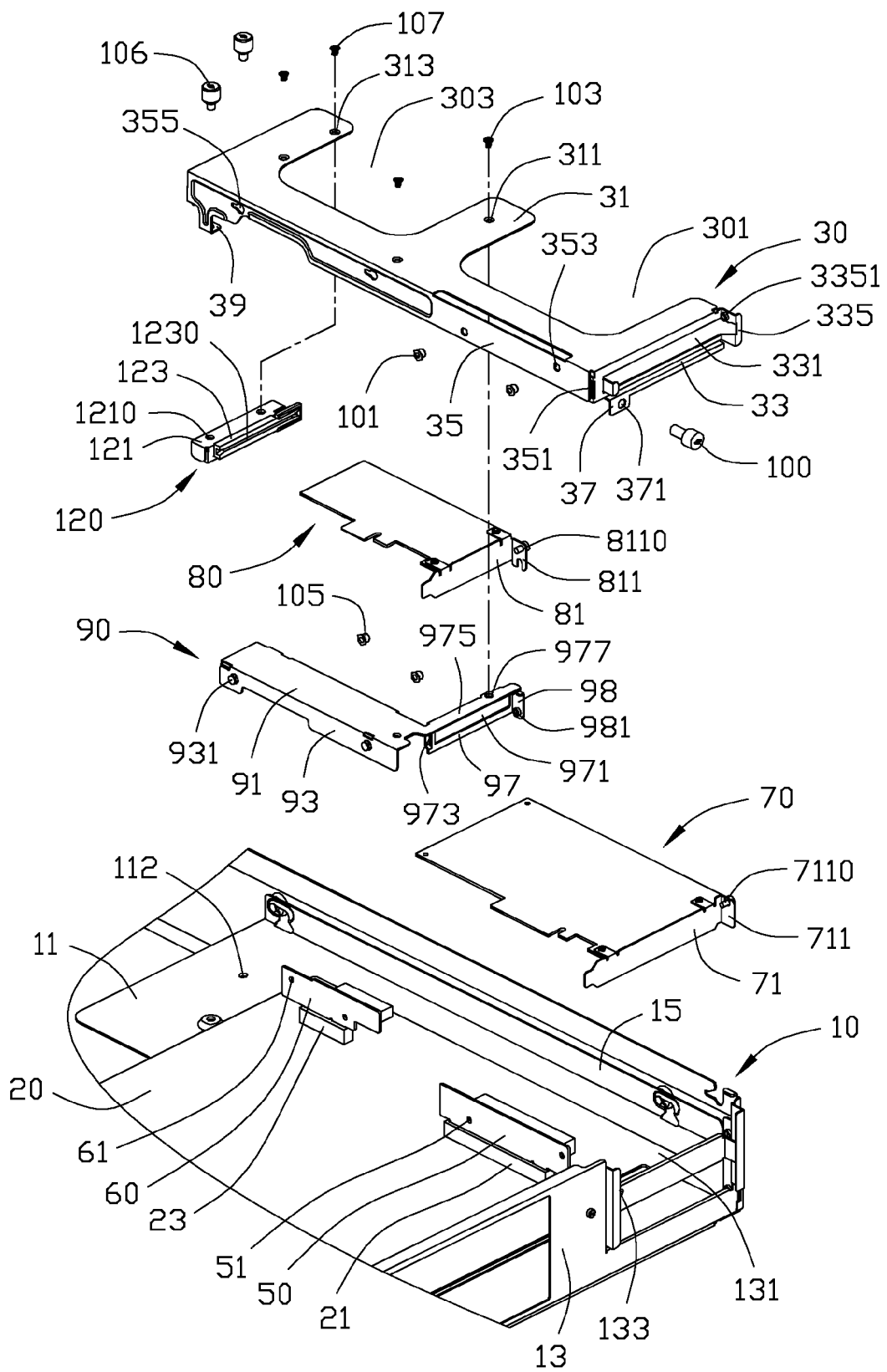
Figure 3:
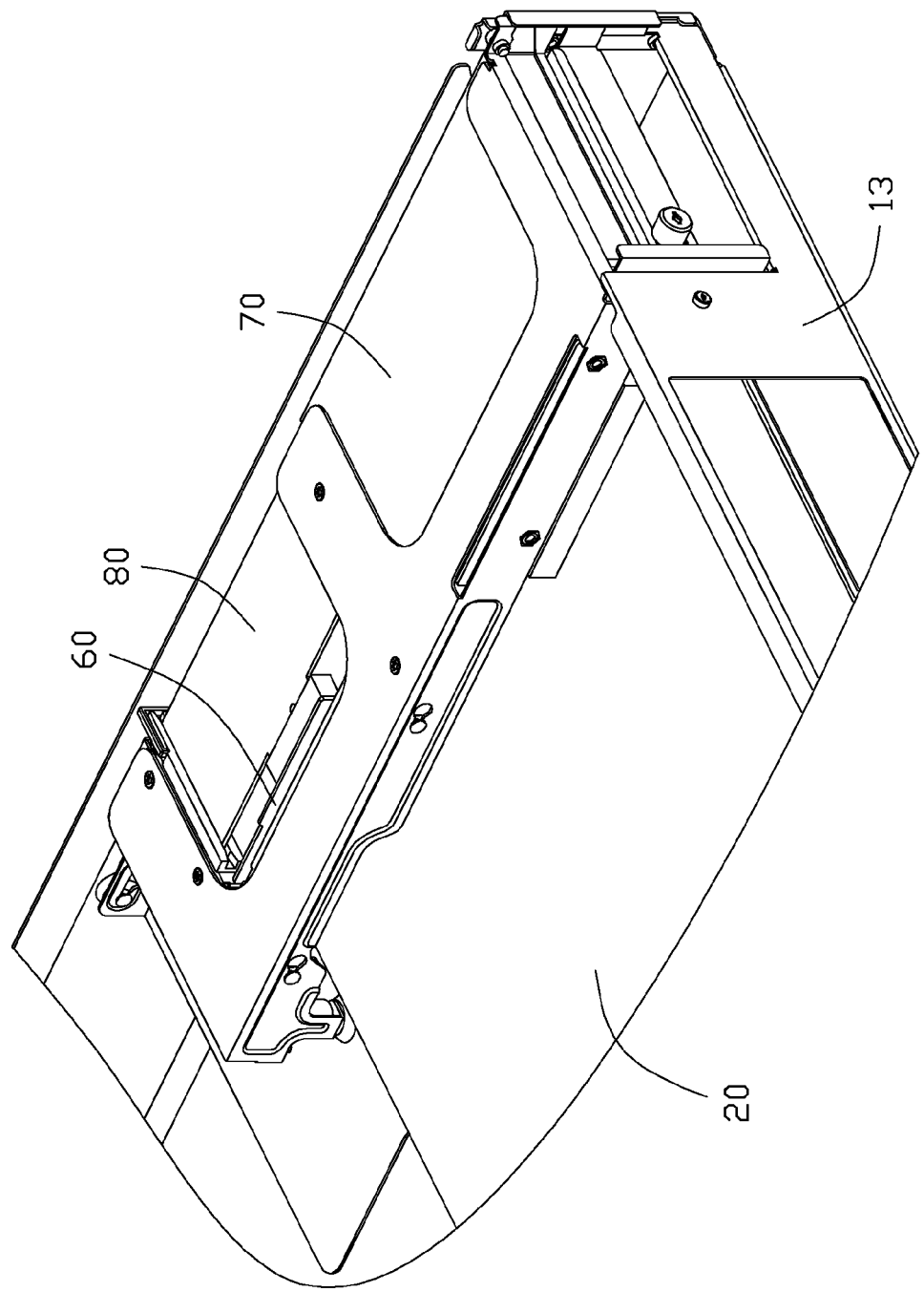
FIG. 3 is an assembled view of FIG. 1.
Figure 4:
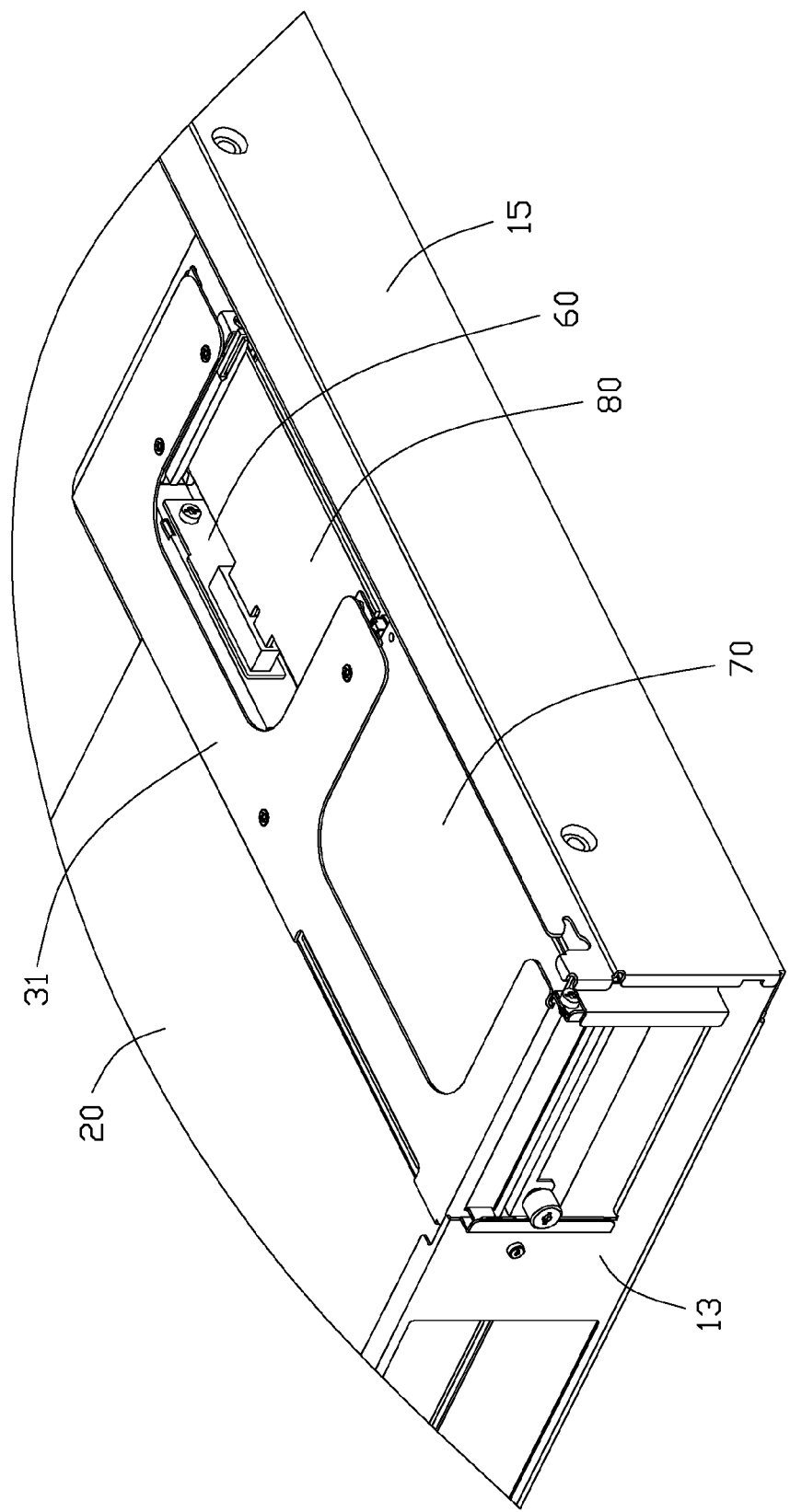
FIG. 4 is an assembled view of FIG. 2.

Referring to FIGS. 1, 3 and 4, an embodiment of a computer system includes a chassis 10 and a mounting bracket 30.

The chassis 10 includes a bottom wall 11, a front wall 13, and a chassis sidewall 15. The bottom wall 11 defines two securing holes 112. A motherboard 20 is secured on the bottom wall 11 adjacent to the front wall 13 and the chassis sidewall 15. A first socket 21 and a second socket 23 are parallel and staggered to each other on the motherboard 20 and parallel to the sidewall 15. The first connector 21 is located further away from the chassis sidewall 15 than the second connector 23. The first socket 21 is configured to be coupled with a first riser card 50, and the second socket 23 is configured to be coupled with a second riser card 60. The first riser card 50 defines two first riser card securing holes 51. The second riser card 60 defines two second riser card securing holes 61. The front wall 13 defines an opening 131 and a securing hole 133.

Figure 2:
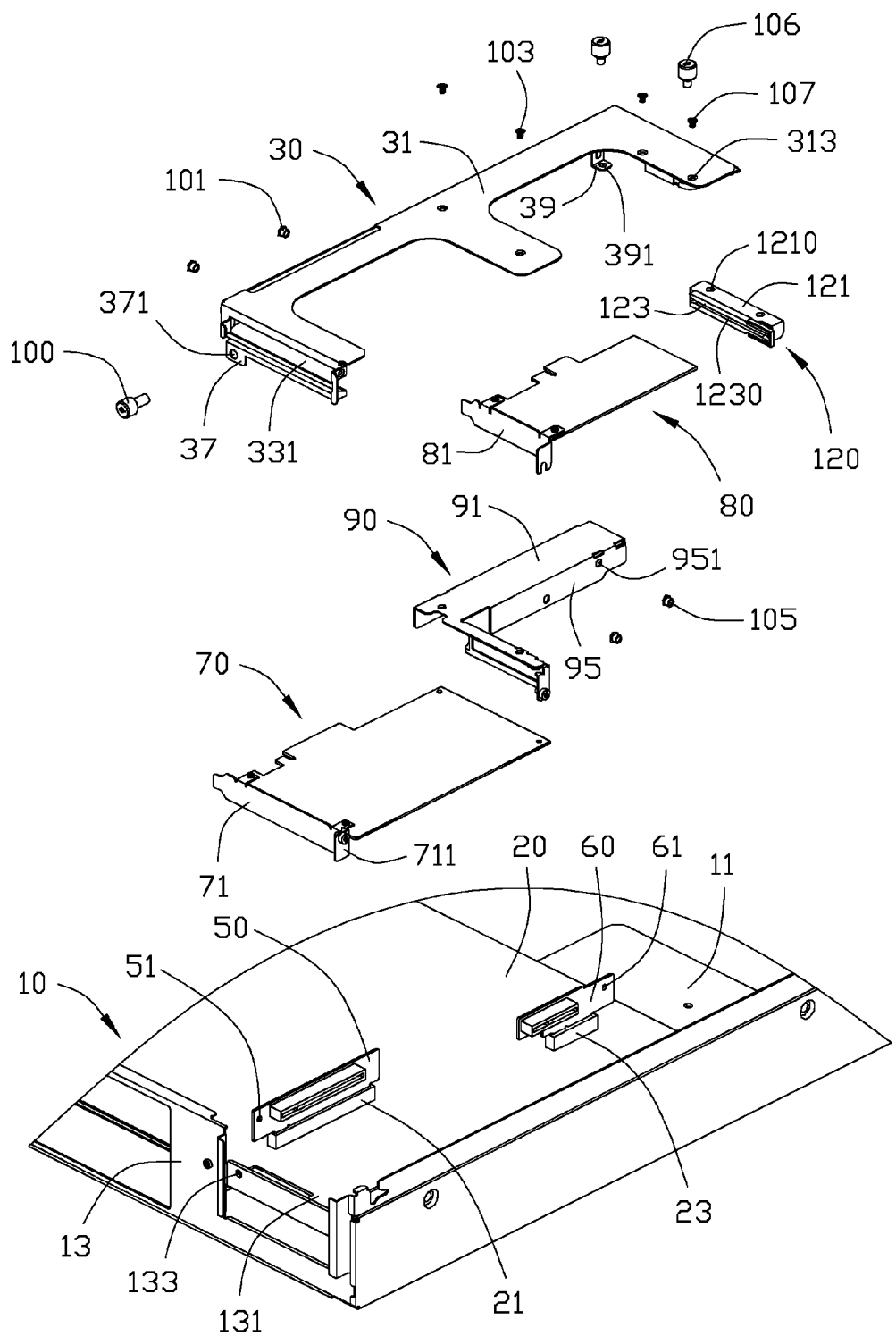
FIG. 2 is similar to FIG. 3, but viewed from another aspect.

The mounting bracket 30 includes a substantially E-shaped brace 31. The E-shaped base 31 defines a first mounting opening 301 and a second mounting opening 303. A securing hole 311 is defined in a middle portion of the base 31 between the first and second mounting openings 301, 303. The mounting bracket 30 also includes a mounting bracket sidewall 33 extending perpendicularly from the base 31 and a securing plate 35 adjacent to the base 31 and the sidewall 33. The sidewall 33 defines an expansion slot 331 corresponding to the opening 131 of the chassis front wall 13. A blocking tab 335 extends from one end of the mounting bracket sidewall 33 perpendicular to the base 31. Two securing posts 3351 protrude from the blocking tab 335. A securing tab 37 extends down from a bottom edge of the sidewall 33. A securing tab securing hole 371 is defined in the securing tab 37 corresponding to the securing hole 133 in the chassis front wall 13. Two support legs 39 (only one is shown in FIGS. 1 and 2) extend from one end of the mounting bracket base 31 away from the sidewall 33. Each support leg 39 defines a support leg securing hole 391 corresponding to the securing hole 112 of the chassis bottom wall 11. The securing plate 35 defines two securing plate securing holes 353 corresponding to the first riser card securing holes 51 in the first riser card 50, and two securing slots 355. A mounting slot 351 is defined in the securing plate 35 adjacent to the sidewall 33. In assembly, the mounting bracket 30 is mountable on the chassis 10 via a plurality of fasteners 100, 106 engaging in the securing holes 371, 391 of the mounting bracket 30 and the securing holes 110, 133 of the chassis 10 correspondingly.

The computer system further comprises a first expansion card 70 capable of coupling with the first riser card 50, and a second expansion card 80 capable of coupling with the second riser card 60. A width of the first expansion card 70 is longer than a width of the second expansion card 80. A first card bracket 71 is secured to one side of the first expansion card 70. The first card bracket 71 includes a bent tab 711 capable of abutting the mounting bracket blocking tab 335. A securing means 7110, such as a columnar protrusion is located on the bent tab 711 corresponding to one of the securing posts 3351 on the mounting bracket blocking tab 335. As shown in FIG. 1, a second card bracket 81 is secured to one side of the second expansion card 80. The second card bracket 81 includes a bent tab 811 capable of abutting the mounting bracket blocking tab 335. A securing means 8110, such as a bolt is formed on the bent tab 811 corresponding to the other securing post 3351 on the mounting bracket blocking tab 335.

The computer system further includes a positioning member 90 engageable with the second riser card 60. The positioning member 90 has a substantially rectangular main body. The main body includes a top wall 91, a first side plate 93, and a second side plate 95 opposite to the first side plate 93. The first side plate 93 and the second side plate 95 extend perpendicularly from opposite edges of the top wall 91. A width of the positioning member top wall 91 is substantially equal to a distance between the first riser card 50 and the second riser card 60. Two securing protrusions 931 are formed on the first side plate 93 corresponding to the securing slots 355 in the mounting bracket 30. The second side plate 95 defines two securing slots 951 corresponding to the second riser card securing slots 61. A third plate 97 extends from one end of the main body top wall 91 perpendicular to the second side plate 95. A mounting slot 973 is defined in one end of the third plate 97. The third plate 97 defines an expansion slot 971 corresponding to the second card bracket 81. A blocking tab 98 extends perpendicularly from the other end of the third plate 97. A securing post 981 protrudes from the blocking tab 98. The third plate also includes a top bent plate 975. A securing hole 977 is defined in the top bent plate 975 corresponding to the securing hole 311 in the base 31.

The computer system further includes a limiting member 120 securable to one side of the mounting bracket 30. The limiting member 120 includes a base 121. Two securing holes 1210 corresponding to the securing holes 313 is defined in a top of the base 121. A supporting member 123 is secured to one side of the base 121. The supporting member 123 defines a receiving slot 1230 configured to accommodate a side edge of the second expansion card 80.

Referring to FIGS. 4 and 5, when assembled, the mounting bracket 30 is secured to the bottom wall 11 of the chassis 10. The E-shaped base 31 is located above the motherboard 20. The first mounting opening 301 of the base 31 and the motherboard 20 cooperatively define a first mounting area, and the second mounting opening 303 of the base 31 and the motherboard 20 cooperatively define a second mounting area. The first socket 21 is located in the first mounting area, and the second socket 23 is located in the second mounting area. The first riser card 50 coupled with the first expansion card 70 is perpendicularly inserted in the first socket 21 of the motherboard 20. The first expansion card 70 is perpendicularly coupled to the first riser card 50 parallel to the motherboard 20. The securing plate 35 of the mounting bracket 30 abuts the first riser card 50. Two fasteners 101 extend through the first riser card securing holes 51 and the mounting bracket securing holes 353 to secure the first riser card 50 to the mounting bracket 30. One end of the first card bracket 71 extends through the mounting slot 351 in the mounting bracket 30. The first card bracket bent tab 711 is secured to the blocking tab 335 of the mounting bracket 30. The mounting bracket 30 together with the first expansion card 70 and the riser card 50 is secured in the chassis 10. Thus, the first expansion card 70 is mounted in the chassis 10.

The second riser card 60 is perpendicularly inserted in the second socket 23 on the motherboard 20. The second expansion card 80 is perpendicularly coupled with the second riser card 60 and parallel to the motherboard 20. The first side plate 93 of the positioning member 90 abuts the mounting bracket securing plate 35. The securing protrusions 931 on the positioning member 90 are engaged in the securing slots 355 in the mounting bracket 35. A fastener 103 correspondingly extends through the securing hole 311 in the mounting bracket base 31 and the securing hole 977 in the positioning member third plate 97, thus securing the positioning member 90 to the mounting bracket 30.

Two fasteners 105 extend through the securing holes 951 in the second side plate 95 and the securing holes 61 in the second riser card 60. Thus, the second riser card 60 is secured to the positioning member 90.

Two fasteners 107 extend through the securing holes 313 on the mounting bracket base 31 and the securing holes 1210 in the limiting member base 121, thus securing the limiting member 120 to one end of the mounting bracket base 31 adjacent to the second mounting area. Then, one end of the second card bracket 81 extends through the mounting slot 973 in the positioning member 90. The bent tab 811 of the second card bracket 81 is secured to the blocking tab 98 of the positioning member third plate 97. The mounting bracket 30 together with the second expansion card 90 and the second riser card 60 is secured in the chassis 10, and the second riser card 60 is engaged in the second socket 23 of the motherboard 20. A side edge of the expansion card 80 is accommodated in the receiving slot 1230 of the supporting member 123. Thus, the second expansion card 80 is mounted in the chassis 10. The second expansion card 80 and the positioning member 90 have a total width substantially equal to the width of the first expansion card 70. When the first riser card 50 is mounted in the chassis 10, the first side plate 93 and the first riser card 50 are lie on a same plane.

The mounting bracket 30 can be used to mount a first type of expansion cards 70 and a second type of expansion cards 80 having different sizes into the chassis 10.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A computer system, comprising:
a chassis;
a motherboard secured in the chassis, a first socket and a second socket are disposed on the motherboard and are parallel to each other;
a mounting bracket secured to the chassis above the motherboard and comprising a securing plate, a first riser card coupled to the first socket and secured to the securing plate, and a second riser card coupled to the second socket; and
a positioning member having two side plates opposite to each other; and one of the side plates is secured to the second riser card, and the other side plate is secured to the securing plate; the securing plate being substantially parallel to the two side plates, the first riser card and the second riser card, and a distance between the two side plates is substantially equal to a distance between the securing plate and the second riser card.

2. The computer system of claim 1, wherein the mounting bracket comprises a base parallel to the motherboard, the first riser card is in the first socket, and the second riser card is in the second socket; a first expansion card and a second expansion card are perpendicularly coupled to the corresponding riser cards; and the mounting bracket base abuts the first expansion card and the second expansion card.

3. The computer system of claim 2, wherein the securing plate is substantially perpendicular to the base.

4. The computer system of claim 2, wherein the first expansion card is substantially parallel to the second expansion card.

5. The computer system of claim 1, wherein the positioning member comprises a third plate, the third plate is secured to the mounting bracket base and defines a slot; the second expansion card comprises a card bracket, and the card bracket is secured to the positioning member third plate.

6. The computer system of claim 2, further comprising a limiting member secured to one end of the mounting bracket, and the limiting member defines a receiving slot; and a side edge of the second expansion card is accommodated in the receiving slot.

7. The computer system of claim 2, wherein the positioning member comprises a top wall, and the mounting bracket base abuts on the positioning member top wall; and a width of the positioning member top wall is substantially equal to a distance between the first riser card and the second riser card.

8. The computer system of claim 2, wherein the chassis comprises a sidewall and a front wall perpendicular to the sidewall; and the first socket is located further away from the chassis sidewall than the second socket, and the first socket is further away from the chassis front wall than the second socket.

9. The computer system of claim 8, wherein the chassis comprises a bottom wall for the motherboard disposed thereon; the sidewall is bent from one end of the base of the mounting bracket and abuts the front wall of the chassis; and two support legs extend from another end of the base opposite to the sidewall, and the support legs are secured to a bottom wall of the chassis.

10. A computer system, comprising:
a chassis;
a motherboard secured in the chassis, a first socket and a second socket are disposed on the motherboard and are parallel to each other;
a mounting bracket having a securing plate, the mounting bracket and the motherboard cooperatively defining a first mounting area and a second mounting area; a first riser card coupled to the first socket and located in the first mounting area, a second riser card coupled to the second socket and located in the second mounting area; and a first expansion card coupled to the first riser card, a second expansion card coupled to the second riser card, and the first expansion card is substantially parallel to the second expansion card; and a positioning member disposed in the second mounting area with a main body being sandwiched between the second riser card and the securing plate of the mounting bracket, so as to connect the second riser card to the mounting bracket.

11. The computer system of claim 10, wherein the mounting bracket comprises a base parallel to the motherboard, a first riser card and the second riser card are located in the corresponding first socket and second socket; the first expansion card and the second expansion card are perpendicularly to the first expansion card and the second expansion card; and the mounting bracket base abuts the first expansion card and the second expansion card.

12. The computer system of claim 11, wherein the securing plate of the mounting bracket is perpendicular to the base, and the first riser card abuts the securing plate.

13. The computer system of claim 10, wherein the chassis comprises a sidewall substantially parallel to the first riser card and the second riser card, and two side plates substantially parallel to the securing plate, the first riser card and the second riser card; and a distance between the two side plates is substantially equal to a distance between the securing plate and the second riser card; and the distance between the two side plates is substantially equal to a distance between the first riser card and the second riser card along a direction substantially perpendicular to the sidewall of the chassis.

14. The computer system of claim 10, wherein the positioning member main body comprises a third plate, the third plate is secured to a middle portion of the mounting bracket base and defines a slot; the second expansion card comprises a card bracket, and the card bracket abuts and is secured to the positioning member third plate.

15. The computer system of claim 11, further comprising a limiting member secured to one end of the mounting bracket adjacent to the second mounting area; and the limiting member defines a receiving slot, and a side edge of the second expansion card is accommodated in the receiving slot.

16. The computer system of claim 10, wherein the positioning member comprises a top wall, and the mounting bracket base abuts on the positioning member top wall; and a width of the positioning member top wall is substantially equal to a distance between the first riser card and the second riser card.

17. The computer system of claim 16, wherein the chassis comprises a sidewall and a front wall perpendicular to the sidewall, and the first socket is located further away from the chassis sidewall than the second socket.

18. The computer system of claim 17, wherein one of the first socket and the second socket is further away from the chassis front wall than the other.

19. The computer system of claim 17, wherein the chassis comprises a bottom wall for the motherboard disposed thereon, a sidewall is bent from one end of the mounting bracket base and abuts the chassis front wall, two support legs extend from another end of the base opposite to the sidewall, and the support legs are secured to the chassis bottom wall.

20. The computer system of claim 8, wherein the first riser card and the second riser card are substantially parallel to the sidewall, and the distance between the securing plate and the second riser card is equal to a distance between the first riser card and the second riser card along a direction substantially perpendicular to the sidewall.

* * * * *